(12) United States Patent
Richards et al.

(10) Patent No.: US 11,449,502 B1
(45) Date of Patent: Sep. 20, 2022

(54) CALCULATING A THROTTLE LIMIT FOR REQUESTS IN A DATABASE SYSTEM

(75) Inventors: Anita Richards, San Juan Capistrano, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 1262 days.

(21) Appl. No.: 12/945,072

(22) Filed: Nov. 12, 2010

(51) Int. Cl.
*G06F 16/2453* (2019.01)

(52) U.S. Cl.
CPC ................................. *G06F 16/2453* (2019.01)

(58) Field of Classification Search
CPC .................................................... G06F 9/5011
See application file for complete search history.

(56) References Cited

U.S. PATENT DOCUMENTS

| | | |
|---|---|---|
| 5,473,773 A | 12/1995 | Aman |
| 5,537,542 A | 7/1996 | Eilert |
| 5,675,797 A | 10/1997 | Chung |
| 6,052,694 A | 4/2000 | Bromberg |
| 6,718,358 B1 | 4/2004 | Bigus |
| 6,950,848 B1 | 9/2005 | Yousefi'zadeh |
| 7,146,353 B2 | 12/2006 | Garg |
| 7,228,546 B1 | 6/2007 | McCarthy |
| 7,395,537 B1 | 7/2008 | Brown |
| 7,657,501 B1 | 2/2010 | Brown |
| 8,190,593 B1 * | 5/2012 | Dean ............................ 707/707 |
| 8,429,096 B1 * | 4/2013 | Soundararajan ...... G06F 9/5005 706/12 |
| 2003/0002649 A1 | 1/2003 | Hettish |
| 2003/0005028 A1 | 1/2003 | Dritschler |
| 2003/0233391 A1 | 12/2003 | Crawford, Jr |
| 2004/0021678 A1 | 2/2004 | Ullah |
| 2004/0225631 A1 | 11/2004 | Elnaffar |
| 2004/0236757 A1 | 11/2004 | Caccavale |
| 2004/0243692 A1 | 12/2004 | Arnold |
| 2005/0038789 A1 | 2/2005 | Chidambaran |
| 2005/0038833 A1 | 2/2005 | Colrain |
| 2005/0039183 A1 | 2/2005 | Romero |
| 2005/0066326 A1 | 3/2005 | Herbeck |
| 2005/0125213 A1 | 6/2005 | Chen |
| 2005/0262183 A1 | 11/2005 | Colrain |
| 2006/0026179 A1 | 2/2006 | Brown |
| 2007/0078843 A1 * | 4/2007 | Brown ..................... G06F 16/22 |
| 2007/0100793 A1 * | 5/2007 | Brown et al. ..................... 707/2 |
| 2007/0162426 A1 | 7/2007 | Brown |
| 2008/0162417 A1 | 7/2008 | Morris |

(Continued)

OTHER PUBLICATIONS

Beyer et al., "Protecting the Quality of Service of Existing Information Systems", Computer Sciences Department, University of Wisconsin, 2003, pp. 1-10.

(Continued)

*Primary Examiner* — Son T Hoang
(74) *Attorney, Agent, or Firm* — Ramin Mahboubian

(57) ABSTRACT

In a database system, at least one metric associated with resources in a database system used by multiple classes of requests is monitored, where a first of the multiple classes is associated with a lower priority than a second of the multiple classes. A throttle limit is calculated for requests of the first class, based on the monitored metric. The calculated throttle limit is used to determine scheduling of the request of the first class for execution.

17 Claims, 4 Drawing Sheets

(56) References Cited

U.S. PATENT DOCUMENTS

| | | | |
|---|---|---|---|
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1* | 7/2008 | Richards | G06F 16/24569 |
| 2009/0019447 A1* | 1/2009 | Hellerstein | G06F 9/4843 |
| | | | 718/104 |
| 2009/0327242 A1* | 12/2009 | Brown | G06F 16/24542 |
| 2010/0125565 A1* | 5/2010 | Burger | G06F 16/2453 |
| | | | 707/E17.131 |
| 2011/0145449 A1* | 6/2011 | Merchant | G06F 9/5011 |
| | | | 710/40 |

OTHER PUBLICATIONS

Nikolaou et al., "Transaction Routing for Distributed OLTP Systems: Survey and Recent Results", Department of Computer Science, University of Crete and Institute of Computer Science, 2002, pp. 1-26.

Sinnwell et al., "Managing Distributed Memory To Meet Multiclass Workload Response Time Goals", Department of Computer Science, University of the Saarland, 2002, pp. 1-8.

ORACLE, "ORACLE9I Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

Brown et al., U.S. Appl. No. 12/317,836 entitled "Database System Having a Service Level Goal Responsive Regulator" filed Dec. 30, 2008 (24 pages).

Brown et al., U.S. Appl. No. 12/317,985 entitled "Database System Having Regulator That Performs Workload Regulation Based On Optimizer Estimates" filed Dec. 30, 2008 (26 pages).

Brown et al., U.S. Appl. No. 12/482,780 entitled "Database System Having a Regulator To Provide Feedback Statistics To an Optimizer" filed Jun. 11, 2009 (33 pages).

Burger et al., U.S. Appl. No. 12/908,052 entitled "Generating an Integrated Execution Plan for Multiple Database Requests" filed Oct. 20, 2010 (34 pages).

Brown et al., U.S. Appl. No. 12/942,466 entitled "Adjusting a Resource Estimate in Response To Progress of Execution of a Request" filed Nov. 9, 2010 (36 pages).

Richards et al., U.S. Appl. No. 12/942,480 entitled "Managing Execution of Requests Using Information Relating To a Job" filed Nov. 9, 2010 (42 pages).

Brown et al., U.S. Appl. No. 12/945,064 entitled "Calculating Priority Indicators for Requests in a Queue" filed Nov. 12, 2010 (41 pages).

* cited by examiner

CALCULATING A THROTTLE LIMIT FOR REQUESTS IN A DATABASE SYSTEM

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

As database systems have increased in size and complexity, it has become more challenging to efficiently implement database operational and management tasks in the database systems.

SUMMARY

In general, at least one metric associated with resources in a database system used by multiple classes of requests is monitored, where a first of the multiple classes is associated with a lower priority than a second of the multiple classes. A throttle limit is calculated for requests of the first class, based on the monitored metric. The calculated throttle limit is used to determine scheduling of the requests of the first class for execution.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
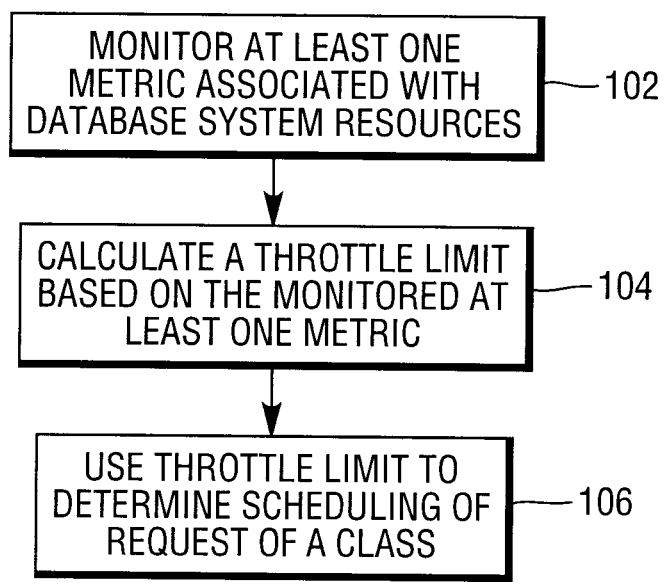
FIG. 1 is a flow diagram of a procedure according to some embodiments.

As used in this discussion, the term "request" or "database request" can refer to a database query (e.g., Structured Query Language or SQL query) that is processed by a database system to produce an output result. Alternatively, a "request" or "database request" can refer to a utility, such as a load utility to perform loading of data from a source to a target. More generally, a "request" or "database request" refers to any command or group of commands that can be submitted to the database system for performing predefined data access (read or write) tasks, or to perform creation or modifications of database structures such as tables, views, etc. In some implementations, a request can belong to one of multiple possible workloads in the database system.

A "workload" (or alternatively "workload group") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group.

Concurrency limits can be used to enforce fairness among different workloads so that one workload is not able to dominate database system resources, just because the workload is experiencing an arrival rate surge of incoming requests ahead of requests from other workloads. When a given concurrency limit is specified for a particular workload, the number of concurrently executing requests of the particular workload cannot exceed the given concurrency limit (such a process for limiting the number of requests of the particular workload that can concurrently execute is referred to as throttling). The use of concurrency limits allows for balancing of usage of database requests among different workloads even in the presence of arrival rate fluctuations of incoming requests. Concurrency limits can be used to reduce or control workload utilization levels of database system resources.

Concurrency limits can also be used to avoid congestion in the database system. In some cases, a database administrator's target is to have a grand total of some predefined number of concurrent requests executing in the database system. Providing a total limit on the number of concurrent requests executing allows for a reduction or elimination of competition for critical resources, especially by lower priority requests.

In performing throttling using concurrency limits, the number of concurrent requests for each workload can be monitored, and if an incoming request (of a particular workload) would cause a respective concurrency limit to be exceeded, then the incoming request can be provided to a delay queue for later execution. Providing or storing a request in the delay queue refers to storing either the entire request in the delay queue, a portion of the request in the delay queue, or a representation of the request in the delay queue.

There are various issues associated with using throttling techniques based on concurrency limits for different workloads. The different concurrency limits may have to be manually set by a database administrator, which can be difficult to accurately set without a lot of trial and error, and continual manual monitoring of database system operations.

In accordance with some embodiments, in addition to or instead of the use of concurrency limits for respective different workloads, a throttle limit can be specified for a certain class of requests (and in particular, for a certain class of lower priority requests). Generally, a database system can have multiple classes of requests, where a first of the multiple classes has a lower priority than a second of the multiple classes. In some examples, the first class of requests includes timeshare requests, where a timeshare request is a request that shares database system resources with other timeshare requests. On the other hand, the second class of requests can include preemptive requests, which preempt resources away from timeshare requests if necessary to meet service level goals (SLGs) of the preemptive requests.

An 'SLG' or "service level goal" refers to a predefined set of one or more performance criteria that are to be satisfied during execution of a request. The SLG can be defined by a database administrator, for example. In some examples, an SLG can be any one or more of the following: a target response time; a target throughput; a policy to specify that some percentage of queries are to finish in some predefined amount of time, and so forth. In a more specific example, the SLG for requests of a particular workload group can be "1 second @ 95," which means that each such request should execute within one second 95% of the time. Another example SLG can be "1,000 queries per hour." An SLG can be defined for a request individually. Alternatively, an SLG can be defined for a workload group that has a number of requests.

Note that timeshare requests are not associated with SLGs in some implementations.

In some embodiments, a workload management subsystem is configured to set the throttle limit for the class of requests including timeshare requests based on monitoring at least one metric associated with resources in a database system used by multiple classes of requests. The throttle limit controls the scheduling of the timeshare requests for execution. By dynamically setting the throttle limit for timeshare requests, the workload management subsystem according to some embodiments is able to avoid or decrease the likelihood of timeshare requests holding critical resources that may be needed or assumed to be needed by preemptive requests (or another class of higher priority requests).

A procedure according to some embodiments is depicted in FIG. 1. The procedure monitors (at 102) at least one metric associated with resources in a database system, where the resources can be used by multiple classes of requests. The monitored at least one metric noted above can include multiple metrics in some implementations. As noted above, a first of the multiple classes of requests is associated with a lower priority than the second of the multiple classes of requests. The metrics (associated with resources in a database system that are used by requests) generally relate to health and demand characteristics of the database system, where a "health characteristic" refers to the health of the database system (e.g., whether components are fully functional or are experiencing faults which can affect resource availability), and a "demand characteristic" refers to demand placed on database system resources by requests.

The procedure further calculates (at 104) a throttle limit for the requests of the first class, where the calculating is based on the monitored at least one metric. The procedure then uses (at 106) the calculated throttle limit to determine scheduling of the requests of the first class for execution. In some implementations, the calculated throttle limit is used to determine if a request in a delay queue can be scheduled for execution. If so, then one of the requests from the delay queue can be selected and dispatched for execution.

Tasks 102 and 104 can be performed at intermittent intervals (e.g., periodic intervals) to allow for continual adjustment of the throttle limit for the first class of requests. In some examples, the interval at which metrics are collected and the throttle limit re-adjusted can be a relatively small interval, such as 10 minutes or less, 5 minutes or less, 1 minute or less, and so forth. By dynamically calculating the throttle limit at relatively short intervals, more effective control of usage of database system resources by the first class of (lower priority) requests can be achieved. The throttle limit can change dynamically and continually, just as system demand and conditions change continually due to mixed workload variations. By monitoring metrics and adjusting the throttle limit based on the monitored metrics, techniques according to some embodiments indirectly regulate the usage of database system resources such that the usage stays within healthy levels, thereby maintaining the database system in an overall healthier state.

The resources in the database system that can be assigned to process respective requests can include worker tasks that execute in the database system. A "worker task" refers to an execution unit for performing an operation (e.g., read, write, sort, merge, join, create table, create view, etc.) associated with a request in a database system. In some implementations, it is desirable to limit the total number of worker tasks that can be concurrently executing at the same time. Therefore, the throttle limit that is dynamically calculated according to some embodiments can be used for indirectly controlling usage of such worker tasks (or other types of resources of the database system) such that the usage of resources stay within healthy levels.

Examples of metrics that can be monitored for setting the throttle limit can include the following. One metric is a usage metric regarding usage of the worker tasks by different workload groups. Another metric is a usage metric regarding usage of worker tasks by different methods, where a "method" refers to a general type of request.

Another metric is an availability metric, which indicates the number of available worker tasks in the database system (those worker tasks not currently used by requests). Another metric that can be monitored includes delays in waiting for a worker task by a specific workload group (delays can be caused by the database system transitioning to an unhealthy state, such as due to an excessive number of concurrently active requests or failure or fault of components of the database system).

There can be other metrics that can be monitored that are not related to worker tasks. For example, one such metric is a service time delay metric, which relates to the amount of delay that requests are experiencing in being serviced. Another metric can be an I/O (input/output) delay metric, which specifies the delay time associated with performing I/O accesses of data in persistent storage, for example. Another metric that can be monitored is a memory delay metric, which indicates the amount of delay associated with accessing system memory.

Figure 2:
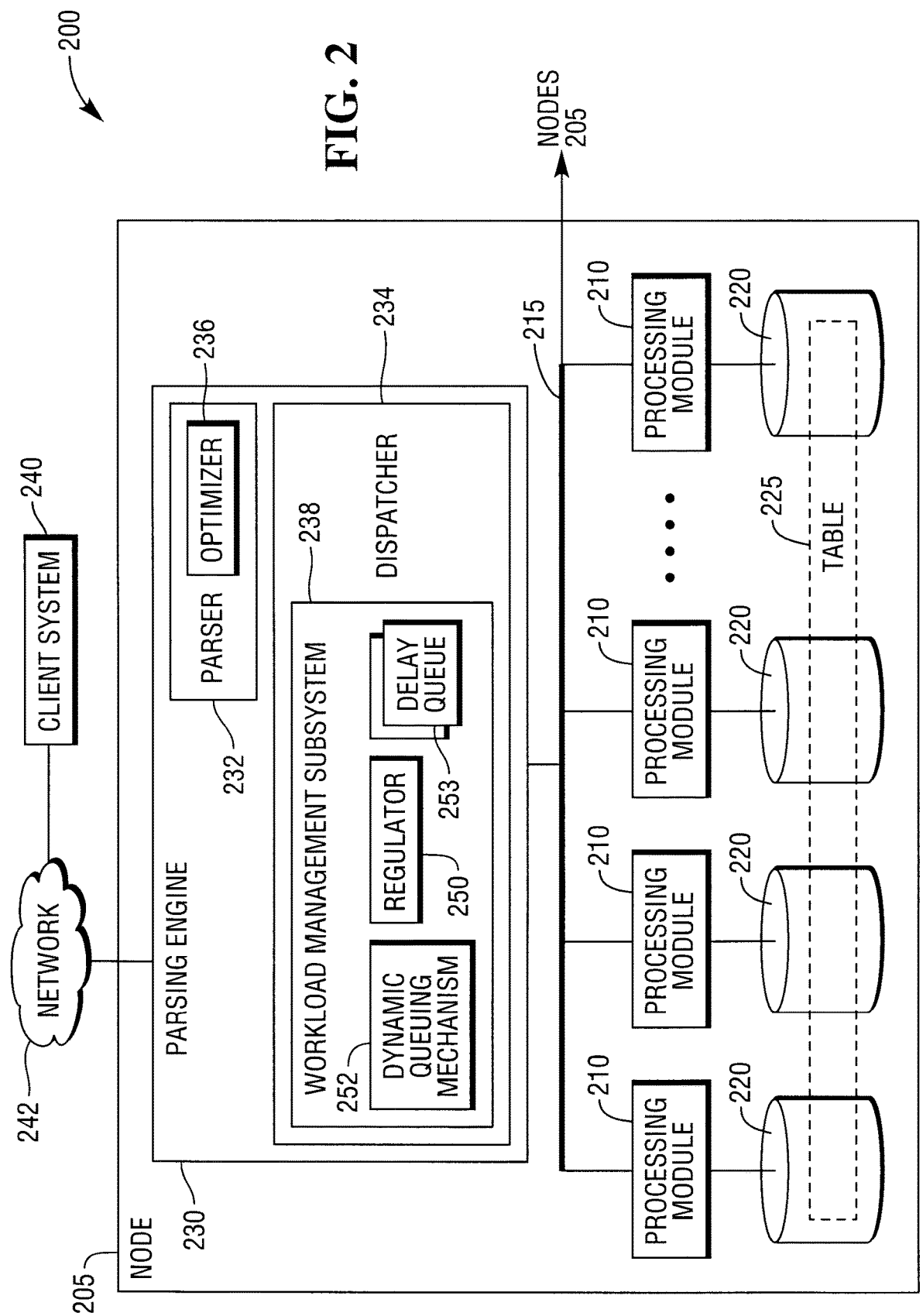
FIG. 2 is a block diagram of an example database system including a workload management subsystem in accordance with some embodiments.

The various metrics above can be considered for calculating the throttle limit (104 in FIG. 2). In addition to calculating the throttle limit based on the monitored metrics, additional heuristics can be considered when calculating the throttle limit. For example, a predefined maximum value can be specified for the throttle limit. In examples where the throttle limit is expressed as a percentage of total database system resources (e.g., worker tasks that can be used by timeshare requests), the predefined maximum value would indicate the maximum percentage of the database system resources that can be allocated to the timeshare requests. Other heuristics can specify that upon system startup, the throttle limit is set at a predefined lower value. In some examples, the predefined lower value can be 25% while the predefined maximum value can be 65%. In other examples, other predefined lower value and predefined maximum value can be used.

The predefined lower value and predefined maximum value can be adjusted based on the mix and trends of preemptive versus timeshare workloads.

The monitoring of metrics and subsequent throttle limit adjustments can rely on control theory techniques to reduce oscillation in the regulation of execution of requests. The control theory techniques can be to base adjustments of the throttle limit on both the current actual metric values as well as recent historical metric values (in other words, instead of using just current actual metric values, some type of an aggregate, such as a rolling average or other type of aggregate, of the current metric values and recent history metric values can be used).

FIG. 2 depicts an example arrangement of a database system 200, which includes a workload management subsystem 238 that is able to perform tasks according to some embodiments. The workload management subsystem 238 includes a regulator 250, a dynamic queuing mechanism 252, and a delay queue 253 (or alternatively, multiple delay queues). The regulator 250 is used to regulate execution of a request by monitoring its progress during execution and adjusting priority settings of the request as needed to ensure that the request meets a target performance goal, such as an SLG (if applicable).

The dynamic queuing mechanism 252 controls the queuing of requests that cannot be scheduled for execution immediately in the delay queue(s) 253. In accordance with some implementations, the dynamic queuing mechanism 252 also controls the prioritization of requests in the delay queue(s) 253 for scheduling an order in which requests in the delay queue(s) 253 are to be executed. In some examples, the scheduling technique used by the dynamic queuing mechanism 252 for the delay queue(s) 253 is a first-in first-out (FIFO) scheduling technique, in which a request in the delay queue(s) 253 is scheduled for execution in a first-in, first-out manner. Alternatively, the dynamic queuing mechanism 252 can calculate priority indicators for the requests in the delay queue(s) 253, where the priority indicator calculated for a request in a respective delay queue 253 can be based on delay times and predefined priority levels set for respective requests in the delay queue(s) 253. The ordering of requests in the delay queue(s) 253 according to the priority indicators is designed to ensure that the requests in the delay queue(s) 253 are scheduled for execution in an order that increases the likelihood that requests are able to meet their respective SLGs (if applicable). Alternatively, a predefined priority level can be a deterministic level that specifies a relative share of database system resources to be used by the corresponding request.

In some implementations, the database system 200 can include multiple computer nodes 205 (just one node depicted in FIG. 2). Each node 205 includes one or more processing modules 210 connected to a network 215. The processing modules 210 manage the storage and retrieval of data in respective data storage facilities 220. Each of the processing modules 210 may be one or more physical processors or may be a virtual processor, with one or more virtual processors running on one or more physical processors. The "worker tasks" referred to above can be part of the processing modules 210.

Each processing module 210 manages a portion of a database that is stored in a corresponding one of the data storage facilities 220. Each data storage facility 220 includes one or more disk drives or other types of storage devices. The nodes 205 of the database system are interconnected by the network 215.

As depicted in FIG. 2, a table 225 is distributed across the data storage facilities 220, where different rows of the table 225 can be distributed across the data storage facilities. In response to a request, one or more of the processing modules 210 can be instructed to retrieve corresponding rows from the table 225 to provide a result to a querying client (which can be one of the client systems 240).

The node 205 also includes a parsing engine 230, which has a parser 232 and a dispatcher 234. The parser 232 receives database requests (such as those submitted by client systems 240 over a network 242) or from another source, parses each received request, and generates executable steps for the parsed query. The parser 232 includes an optimizer 236 that generates query plans (also referred to as execution plans) in response to a request, selecting the most efficient from among the plural query plans. The optimizer 236 can also produce resource estimates (e.g., time estimates or estimates of usage of various database system resources) for the query plan.

The dispatcher 234 sends the executable steps of the query plan generated by the parser 232 to one or multiple processing modules 210 in the node 205. The processing modules 210 (or more specifically worker tasks that are part of the processing modules) execute the steps. If the request specifies retrieval of data from the table 225, then the retrieved data is sent back by the database system 200 to the querying client system 240 for storage or display at the client system 240 (which can be a computer, personal digital assistant, etc.). Alternatively, the request can specify a modification of the table (adding data, changing data, and/or deleting data in the table).

The dispatcher 234 includes the workload management subsystem 238 according to some embodiments. Note that parts of the workload management subsystem 238 can also be in the processing modules 210 (not depicted), since the workload management subsystem 238 also monitors execution of requests, as discussed below.

In embodiments with multiple parsing engines 230, each parsing engine can have a corresponding parser and/or workload management subsystem.

Figure 3:
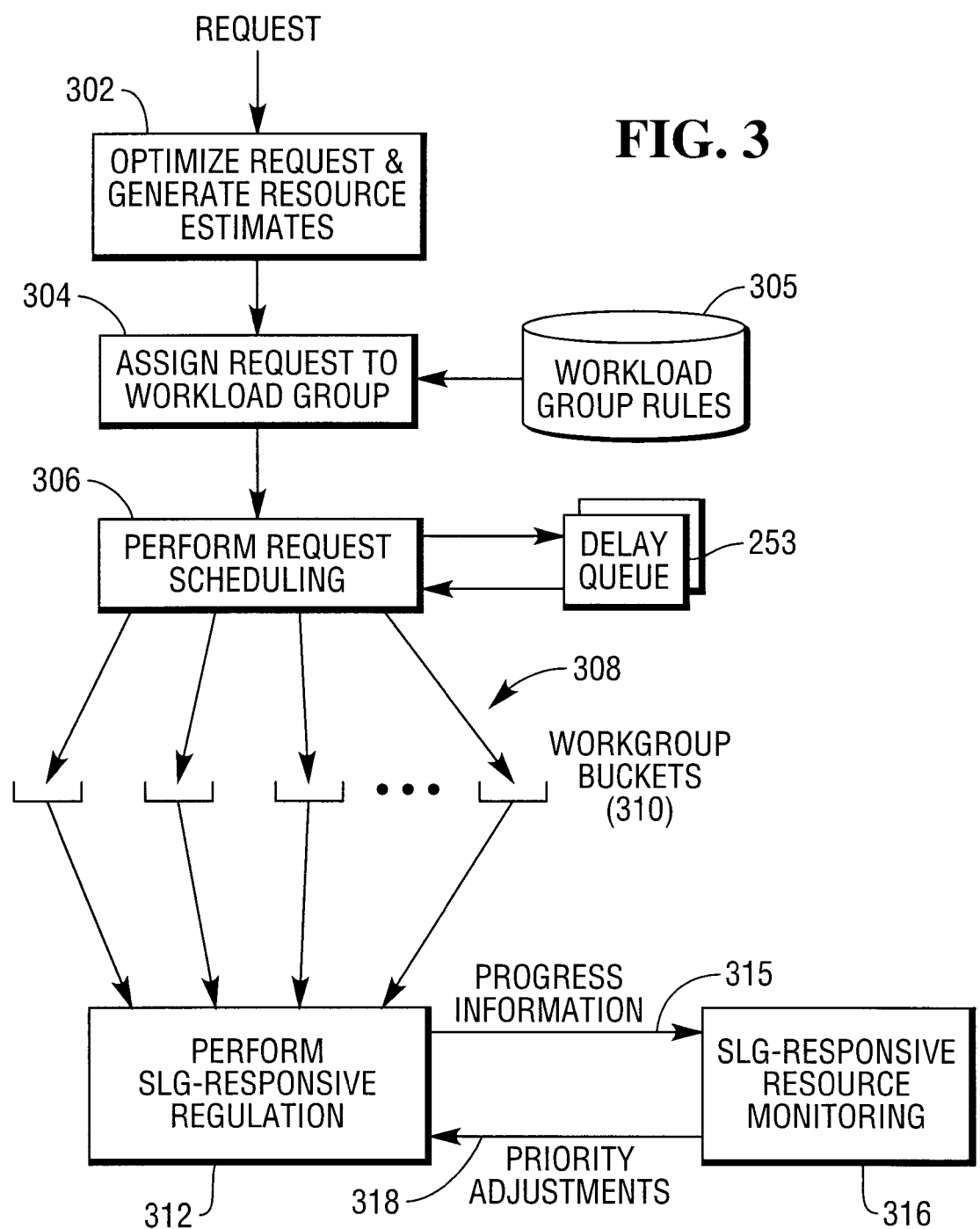
FIG. 3 illustrates an architecture for regulating workloads, in accordance with some embodiments.

Operation of the optimizer 236 and workload management subsystem 238 is illustrated in more detail in FIG. 3. In accordance with some implementations, the workload management subsystem provides a "closed-loop" workload management architecture that is capable of supporting complex workloads and capable of self-adjusting to various types of workloads. The database system's operation has several major phases: (1) assigning incoming requests to workload groups, (2) performing dynamic scheduling to determine whether incoming requests can be scheduled for immediate execution or whether certain incoming requests are provided into the delay queue(s) 253 for later execution; (3) monitoring the execution of the workload groups against SLGs (if applicable); and (4) regulating (adjusting and managing) the workload flow and priorities to achieve SLGs (if applicable).

As shown in FIG. 3, an incoming request is optimized (at 302) by the optimizer 236. In generating query plans and selecting an optimal one of the query plans for execution by the processing modules 210, the optimizer 236 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some implementations, the optimizer 236 can generate other resource estimates, including estimates of processor usage, input/output (I/O) resource usage, and network resource usage, for each step of the request. An I/O resource can be a physical I/O resource (e.g., megabits per second for a physical storage device) or a logical I/O resource (e.g., logical blocks per second, where a logical block refers to some predefined amount of data used by a data access subsystem such as a file system and the like).

The estimate of usage of the processor resource can indicate the expected number of cycles of one or more CPUs that execution of a request is expected to consume. The estimate of usage of the I/O resource can indicate the expected number of I/O accesses (e.g., read or write accesses of disk storage, for example) that execution of the request is expected to invoke. The estimate of usage of the network resource can indicate an amount of network traffic (such as traffic between different computer nodes) that is expected in the execution of the request.

The optimizer 236 can produce the estimates of processor usage, I/O resource usage, and network resource usage based on a cost model. For example, the optimizer 236 can retrieve information relating to the processor capacity, which can be expressed in terms of millions of instructions per second (MIPS). Also, the optimizer 236, as part of its normal optimization tasks, can estimate the cardinalities of tables and intermediate spool files that are involved in execution of the request. Based on the estimated cardinalities and the processor capacity, the optimizer 236 is able to estimate the processor usage that is expected for execution of the request. The processor usage estimate can be performed on a per-step basis for each step of the query plan. Note that different steps can access different tables or different parts of tables across different access modules in the system.

Similarly, the optimizer 236 can also retrieve information regarding memory size (size of high-speed memory that can be used to temporarily store data). Based on the memory size and the expected accesses of data in base tables and intermediate tables that will be involved in each step of a query plan, the optimizer 236 is able to estimate the expected I/O usage for each step. The I/O resource usage includes I/O accesses of disk storage (e.g., the number of block I/Os to read from or write to a table or index).

Moreover, the optimizer 236 is able to determine which data-storage facilities 220 store data involved in the execution of the request. For each step of the query plan, the optimizer 236 is able to estimate how much inter-processor module or inter-node traffic is expected this will allow the optimizer 236 to estimate the network resource usage (usage of the network 215 of FIG. 2) is expected for each step.

Based on the resource estimates (response time estimate and/or processor usage, I/O resource usage, network resource usage, and so forth), and/or based on other classification criteria for a respective workload, the workload management subsystem 238 assigns (at 304) the request to one of the multiple workload groups that have been defined. The assignment is based on accessing workload group rules 305 (as defined by workload definitions) to match characteristics of the request as identified by the optimizer 236 with various workload definition rules. The workload group corresponding to the workload definition rules most closely matching the characteristics of the request is identified, where the incoming request is assigned to the identified workload group.

Next, the regulator 250 of the workload management subsystem 238 performs request scheduling (at 306), where the regulator 250 determines whether or not an incoming request is to be immediately scheduled for execution or whether the incoming request should be held for later execution. In some examples, as part of the request scheduling performed at 306, the regulator 250 can also consider concurrency limits the maximum number of concurrent executing requests from each workload group. The regulator 250 monitors the concurrency limits of the workload groups, and if the concurrency limit of the corresponding workload group (that the incoming request is assigned to) is above a predefined threshold (which means that there are too many concurrent executing requests for this workload group), then the incoming request for that workload group waits in a respective delay queue 253 for later execution. In other example implementations, concurrency limits can be omitted.

The request scheduling (306) performed by the regulator 250 can also include the calculation of a throttle limit for a particular class of request, such as the timeshare request discussed above. As noted above, this throttle limit is dynamically computed based on monitored one or more metrics regarding health and demand characteristics of the database system 200. The throttle limit can be used as part of the request scheduling (206) for determining whether a timeshare request can be scheduled immediately for execution, or for determining whether a particular timeshare request in the respective delay queue 153 can be scheduled for execution. For example, if the throttle limit is a threshold percentage of worker tasks of the database system 200 that can be used by timeshare requests, the regulator 250 can determine, as part of the request scheduling (306) whether a current percentage of usage of the worker tasks (current concurrency level) by timeshare requests exceeds the threshold percentage (throttle limit). If so, then the timeshare request cannot be scheduled for execution. On the other hand, if the current percentage of usage by timeshare requests of worker tasks (current concurrency level) is less than the throttle limit, then one or more of the timeshare requests (incoming or stored in the respective delay queue 253) can be scheduled for execution.

Thus, for timeshare requests stored in the respective delay queue 253, the determination of whether a timeshare request in the respective delay queue can be scheduled for execution is further based on the dynamic throttle limit. In addition, in some implementations, timeshare requests in the respective delay queue 253 can also be ordered based on priority indicators calculated for the corresponding requests, as mentioned above.

Any non-timeshare requests in the respective delay queue 253 are not subject to the throttle limit for timeshare requests. However, priority indicators can also be calculated for such non-timeshare requests in the respective delay queue 253 to control the order by which such requests are scheduled for execution.

The priority indicators can be calculated based on delay times and predefined priority levels for respective requests in the delay queue(s) 253. A "delay time" of a request in the delay queue(s) 253 includes the amount of time that the respective request has spent in the delay queue(s) 253 waiting for execution. The predefined priority level for a particular request refers to some pre-assigned priority level of the particular request. For example, the predefined priority level can be based on the SLG of the request (if the request has an SLG). Alternatively, or additionally, the predefined priority level can be a user-assigned "pecking order," which can be assigned by a user to specify an order of priority for the particular request. In some implementations, a pecking order and/or SLG can be provided for one class of requests, such as preemptive requests.

For another class of requests, such as timeshare requests in some examples, the predefined priority level can be a deterministic value that is assigned (either automatically or manually) to a particular timeshare request to control a respective share of database system resources that can be used by the particular timeshare request during execution.

As further shown in FIG. 3, a request that is scheduled for execution (either a request that can be scheduled for immediate execution or a request that has been retrieved from a respective delay queue 253) is placed (at 308) by the regulator 250 into one of multiple workload group buckets 310 (as defined by corresponding workload definitions). The "buckets" 310 can be execution queues that contain requests scheduled for execution.

Next, for requests associated with SLGs, the regulator 250 performs SLG-responsive regulation (at 312) at the request level. The regulator 250 selects a request from one of the buckets 310, in an order determined by priorities associated with the workload groups, and executes the selected request.

Although not shown in FIG. 3, the regulator 250 can also manage execution of timeshare requests. Since timeshare requests are not associated with SLGs, the management of execution of timeshare requests are not based on SLGs. However, as noted above, timeshare requests can be associated with corresponding deterministic levels that specify relative shares of database system resources to be used by the corresponding timeshare requests. The value of the respective deterministic level specifies a corresponding share of database system resources (e.g., worker tasks) by the respective timeshare request.

In accordance with some implementations, the SLG-responsive regulation task 312 performed by the regulator 250 (for requests associated with SLGs) includes adjusting priority settings for an individual request to allow a request to meet its respective SLG. In other implementations, the SLG-responsive regulation task 312 is also able to recalibrate resource estimates. Initial estimates are provided by the optimizer 236 as part of its optimization tasks. During execution of a request, the regulator 250 can determine that the resource estimates from the optimizer 236 are no longer accurate, in which case the regulator 250 is able to adjust the resource estimates based on the monitored progress of the execution of the request.

The resource estimates can be adjusted (on a continual basis) during execution of various steps of an execution plan corresponding to the request.

As further depicted in FIG. 3, an SLG-responsive resource monitor 316 includes a regulator feedback detection and adjustment mechanism that performs feedback detection and dynamic resource adjustment. The SLG-responsive resource monitor 316 receives progress information (315) from the SLG-response regulation task 312, where the progress information 315 is reported based on monitoring execution of the request.

The SLG-responsive resource monitor 316 is able to consider, at each step of the execution plan associated with the request, whether the progress information for execution of the request so far that is received from the SLG-responsive regulation task 312 is consistent with the current resource estimates provided for the respective steps of the query plan. The progress information 315 can indicate whether or not the current resource estimates are inadequate (actual usage exceeds estimated resource usage) or excessive (actual usage less than estimated resource usage). If recalibration of resource estimates is needed based on comparing the progress information 315 to the current resource estimates, recalibration of the resource estimates can be performed.

Based on the recalibrated resource estimates, the SLG-responsive resource monitor 316 can provide priority adjustments (318) to the SLG-responsive regulation task 312. In response to the priority adjustments (318), the SLG-responsive regulation task 312 adjusts priority settings accordingly to adjust priority settings for the remaining steps of the execution plan.

The following discusses further details regarding the calculation of a throttle limit for a particular class of requests, such as timeshare requests. As noted above, the dynamic calculation of the throttle limit is based on monitoring metrics relating to the health and demand characteristics of the database system.

Each metric can be associated with a target value (T). The following lists example data obtained from monitoring performed by the regulator 250: a current metric value (Cur) (which represents the current value of the monitored metric); current timeshare concurrency level (A) (which is the concurrency level for timeshare requests that are currently actively executing, where in some examples "concurrency level" can refer to the percentage of database system resources used by the active timeshare requests); rolling average concurrency (Ar) (which is a rolling average of the current timeshare concurrency level and selected recent timeshare concurrency levels from historical data, where "recent" can refer to some predefined time range or predefined number of past time intervals); and rolling average metric value (CurR) (which is a rolling average of multiple values of the metric, including the current metric value Cur and selected past metric values, selected based on some predefined past number of time intervals and/or past time range).

To dynamically calculate the throttle limit in accordance with some embodiments, a theoretical concurrency level ($C_c$) is derived, where this theoretical concurrency level would drive the metric to the metric target (T):

$$C_c = (T*A)/\text{Cur}.$$

In addition, a theoretical concurrency level ($C_r$) is calculated that would drive the rolling average of the corresponding metric to a predefined target:

$$C_r = (T*A)/\text{CurR}.$$

Next, the minimum of $C_c$ and $C_r$ is selected, according to:

$$C_n = \min(C_c, C_r).$$

The foregoing is performed for an individual metric. Next, assuming there are multiple metrics, the calculated $C_n$ values for all metrics are considered, where n=1, 2, . . . , M (M≥2), and one of the $C_1, C_2, \ldots, C_m$ values is selected for use as the throttle limit, such as according to the following:

$$C_t = \min(C_1, C_2, \text{etc}).$$

In the example above, the minimum of $C_1, C_2, \ldots, C_M$ is selected for use as $C_t$. In other examples, other selection criteria can be provided for selecting among $C_1, C_2, \ldots, C_M$.

Finally, based on predefined heuristics, the value of $C_t$ may be adjusted. For example, if the predefined maximum value for the throttle limit is 65%, and $C_t$ exceeds 65%, then $C_t$ would be adjusted to be equal to 65%.

Figure 4:
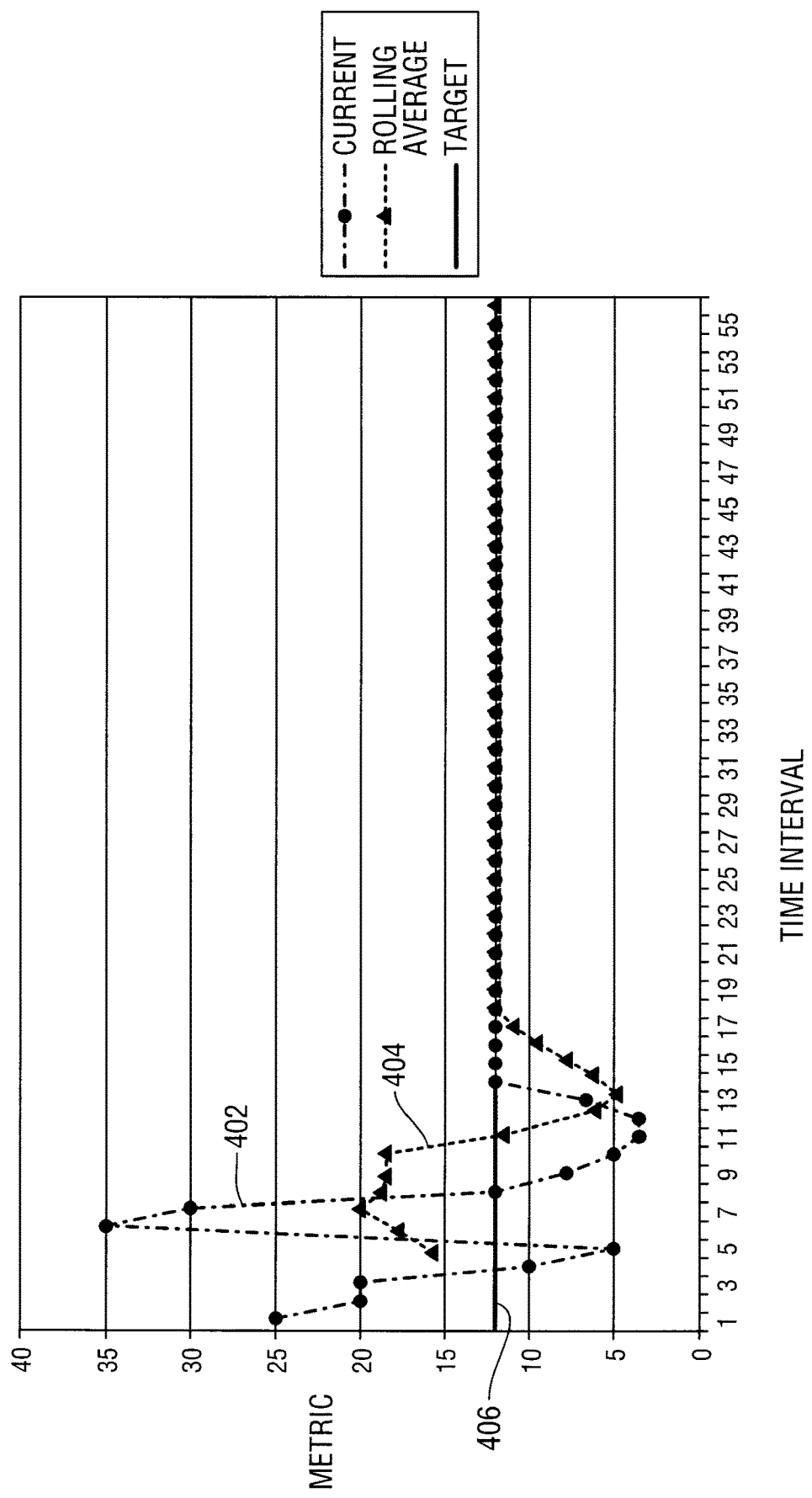
FIG. 4 is a timing diagram depicting example metric values.

FIG. 4 is a timing diagram showing metric values as a function of time. Three metric values are depicted in FIG. 4, including a current metric value (Cur) (represented by curve 402), a rolling average of values of the metric (CurR) (as represented by curve 404), and a target metric value (T) (as represented by horizontal line 406). FIG. 4 shows that by setting the throttle limit $C_t$ according to some implementations, the current metric value Cur (402) and rolling average metric value CurR (404) can be adjusted to be aligned with the target (T). Thus, using techniques according to some implementations, metrics can be brought back to conformity with the target and kept there.

Consider the following example of a metric exceeding its target in a large way. Given a metric target (T) of 4.8, if in a first time interval, the current metric measured was 33, the metric is over its target by a factor of (33/4.8=) 6.9×. To bring the metric back in line with the target, techniques according to some implementations can adjust from a current concurrency level of 10 down to 1.4 (rounded down to 1). This should result in a quick return to conformance if at the end of the first interval there remains no more than one active timeshare request, since the throttling mechanism will simply not allow a new request to start until the current or rolling average is back to conformance with the metric target (T).

However if at the end of the interval, there are more than one active timeshare request, the over-threshold behavior will continue. It may not continue to such a great degree if some of the executing requests completed during that interval, or if preemptive request demand diminishes, to allow a larger share of resources to be used by timeshare requests.

In the next interval, the technique would repeat, resulting in a more refined adjustment to concurrency levels. The iterative nature of this algorithm that occurs relatively frequently (at every event interval) provides a mechanism for continually adjusting to the dynamic nature of the system, especially since throttle adjustments are not guaranteed to have an immediate effect, but are subject to requests completing, new arrivals and competing workload activities.

In some implementations, various values associated with throttling can be logged. For example, the dynamically adjusted throttle limit can be logged, along with delay queue time (the amount of delay time experienced by timeshare requests). This can help a database administrator in later understanding why a particular timeshare request has not been released from the respective delay queue 253.

By using techniques or mechanisms according to some embodiments, a workload management subsystem will be able to determine an optimal or improved throttle limit for a particular class of requests (e.g., timeshare requests) based on actual monitored metrics of a database system. As a result, manual intervention and analysis (such as by a database administrator) can be avoided or reduced.

Machine-readable instructions of various modules shown in FIG. 2 or 3 are loaded for execution on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    monitoring, by at least one processor in a database system, at least one database metric of database resources in the database system, wherein the database resources are used by a plurality of classes of database requests of data associated with the database system;
    in response to the plurality of classes of the database requests for the data associated with the database system, executing the database requests as a plurality of database queries to access the data, wherein a first class of the plurality of classes of the database requests is associated with a lower priority of execution than a second class of the plurality of classes of the database requests; and
    calculating, by the at least one processor, a throttle limit on the execution of database requests of the first class, wherein the calculating is based on at least the monitored at least one database metric, wherein the at least one database metric includes one or more concurrency limits associated with the first class of the plurality of classes of the database requests measured as an aggregate value taken over time when the plurality of classes of database requests are being executed by the database system, and wherein the one or more concurrency limits associated with the first class indicate at least a maximum number of database requests being concurrently executed;
    using, by the at least one processor, the calculated throttle limit to determine a scheduling of the database requests of the first class to cause a delay in execution of the database requests of the first class, such that the throttle limited is not exceeded;
    scheduling, by the at least one processor, the database requests of the first class in accordance with the determined scheduling to cause a delay in execution of the database requests of the first class, and
    wherein the calculating the throttle limit is further based on at least a maximum value for the throttle limit;
    wherein the calculating the throttle limit based on the monitored at least the metric and the maximum value comprises:
        calculating a value of the throttle limit taking into account at least the monitored at least one metric; and
        if the calculated value exceeds the maximum value, adjusting the throttle metric to the maximum value.

2. The method of claim 1, further comprising:
    providing the database requests of the first class in a delay queue; and
    scheduling a next request of the database requests in the delay queue for execution using the throttle limit.

3. The method of claim 1, wherein the calculated throttle limit specifies that usage of the resources by the database requests of the first class is not to exceed a percentage as specified by the calculated throttle limit.

4. The method of claim 1, wherein the monitoring the at least one metric comprises monitoring a plurality of metrics, and wherein the calculating the throttle limit is based on the monitored plurality of metrics.

5. The method of claim 1, wherein the calculating the throttle limit comprises:
receiving a target value for the monitored at least one metric;
receiving a current value of the throttle limit; and
computing a new value of the throttle limit using the target value and the current value.

6. The method of claim 5, wherein the calculating the throttle limit further comprises:
receiving a current concurrency level associated with the database request of the first class, wherein the current concurrency level indicates a percentage of the database system resources used by the database requests of the first class, wherein the computing the new value of the throttle limit further uses the current concurrency limit.

7. The method of claim 6, wherein the calculating the throttle limit further comprises:
receiving an aggregate of the monitored at least one metric, wherein the aggregate is based on values of the monitored at least one metric over time, wherein computing the new value of the throttle limit further uses the aggregate.

8. A database system comprising at least one hardware processor configured to:
monitor at least one database metric of database resources in the database system, wherein the database resources are used by a plurality of classes of database requests of data associated with the database system;
in response to the plurality of classes of the database requests for the data associated with the database system, execute the database requests as a plurality of database queries to access the data, wherein a first class of the plurality of classes of the database requests is associated with a lower priority of execution than a second class of the plurality of classes of the database requests; and
calculate a throttle limit on the execution of database requests of the first class, wherein the calculating is based on at least the monitored at least one database metric, wherein the at least one database metric includes one or more concurrency limits associated with the first class of the plurality of classes of the database requests measured as an aggregate value taken over time when the plurality of classes of database requests are being executed by the database system, and wherein the one or more concurrency limits associated with the first class indicate at least a maximum number of database requests being concurrently executed;
use the calculated throttle limit to determine a scheduling of the database requests of the first class to cause a delay in execution of the database requests of the first class, such that the throttle limited is not exceeded;
schedule the database requests of the first class in accordance with the determined scheduling to cause a delay in execution of the database requests of the first class, and
wherein the calculating the throttle limit is further based on at least a maximum value for the throttle limit;
wherein the calculating the throttle limit based on the monitored at least the metric and the maximum value comprises:
calculating a value of the throttle limit taking into account at least the monitored at least one metric; and
if the calculated value exceeds the maximum value, adjusting the throttle metric to the maximum value.

9. The database system of claim 8, wherein the database resources include worker tasks that perform operations associated with the database requests in the database system.

10. The database system of claim 8, further comprising a delay queue that stores at least the database requests of the first class that are waiting to be executed, wherein the scheduling of the database requests of the first class comprises:
scheduling the database requests of the first class in the delay queue for execution based on the throttle limit.

11. The database system of claim 10, wherein each of the database requests in the delay queue is associated with priority indicators that specify a priority order of the database requests in the delay queue.

12. The database system of claim 11, wherein the at least one processor is configured to further:
calculate the priority indicators based on delay times and predefined priority levels of corresponding one of the database requests in the delay queue, wherein each of the delay times includes an amount of time waiting in the delay queue by a corresponding one of the database requests in the delay queue.

13. The database system of claim 8, wherein the calculated throttle limit specifies that usage of the database resources by the database requests of the first class is not to exceed a percentage as specified by the calculated throttle limit.

14. The database system of claim 8, wherein the at least one processor is configured to calculate the throttle limit by:
receiving a target value for the monitored at least one metric;
receiving a current value of the throttle limit; and
computing a new value of the throttle limit using the target value and the current value.

15. The database system of claim 14, wherein the at least one processor is configured to calculate the throttle limit by further:
receiving a current concurrency level associated with the database request of the first class, wherein the current concurrency level indicates a percentage of the database resources used by the database request of the first class, wherein the new value of the throttle limit is computed further based on the current concurrency limit.

16. The database system of claim 15, wherein the at least one processor is configured to calculate the throttle limit by further: receiving a rolling average of the metric, wherein the rolling average is based on values of the monitored metric over time, wherein the new value of the throttle limit is computed further based on the rolling average.

17. An article comprising at least one machine-readable non-transitory storage medium storing instructions that upon execution by a processor of a database system cause the database system to:
monitor at least one database metric of database resources in the database system, wherein the database resources are used by a plurality of classes of database requests of data associated with the database system;
in response to the plurality of classes of the database requests for the data associated with the database system, execute the database requests as a plurality of database queries to access the data, wherein a first class of the plurality of classes of the database requests is associated with a lower priority of execution than a second class of the plurality of classes of the database requests; and calculate a throttle limit on the execution of database requests of the first class, wherein the calculating is based on at least the monitored at least one database metric, wherein the at least one database metric includes one or more concurrency limits associated with the first class of the plurality of classes of the database requests measured as an aggregate value taken over time when the plurality of classes of database requests are being executed by the database system, and wherein the one or more concurrency limits associated with the first class indicate at least a maximum number of database requests being concurrently executed;

use the calculated throttle limit to determine a scheduling of the database requests of the first class to cause a delay in execution of the database requests of the first class, such that the throttle limited is not exceeded;

schedule the database requests of the first class in accordance with the determined scheduling to cause a delay in execution of the database requests of the first class, and wherein the calculating the throttle limit is further based on at least a maximum value for the throttle limit;

wherein the calculating the throttle limit based on the monitored at least the metric and the maximum value comprises:

calculating a value of the throttle limit taking into account at least the monitored at least one metric; and if the calculated value exceeds the maximum value, adjusting the throttle metric to the maximum value.

* * * * *